(12) United States Patent
Truslow et al.

(10) Patent No.: US 12,030,634 B2
(45) Date of Patent: Jul. 9, 2024

(54) PAYLOAD SEPARATION DURING DESCENT OF AERIAL VEHICLE

(71) Applicant: Aerostar International, LLC, Columbia, MD (US)

(72) Inventors: Samuel Truslow, Sunnyvale, CA (US); Ewout van Bekkum, San Francisco, CA (US)

(73) Assignee: Aerostar International, LLC

( * ) Notice: Subject to any disclaimer, the term of this patent is extended or adjusted under 35 U.S.C. 154(b) by 71 days.

(21) Appl. No.: 17/184,098

(22) Filed: Feb. 24, 2021

(65) Prior Publication Data

US 2022/0267004 A1    Aug. 25, 2022

(51) Int. Cl.
| | | |
|---|---|---|
| *B64D 1/12* | (2006.01) | |
| *B64B 1/40* | (2006.01) | |
| *B64D 17/62* | (2006.01) | |
| *B64D 43/00* | (2006.01) | |

(52) U.S. Cl.
CPC .......... *B64D 1/12* (2013.01); *B64B 1/40* (2013.01); *B64D 17/62* (2013.01); *B64D 43/00* (2013.01)

(58) Field of Classification Search
CPC .......... B64D 1/12; B64D 17/56; B64D 17/58; B64D 17/72; B64D 17/725; B64B 1/48
See application file for complete search history.

(56) References Cited

U.S. PATENT DOCUMENTS

| | | | | |
|---|---|---|---|---|
| 2,570,295 A | * | 10/1951 | Vantine, Jr. | B64D 17/54 342/61 |
| 3,012,810 A | * | 12/1961 | Tenney | F42B 3/006 89/1.14 |
| 5,825,667 A | * | 10/1998 | Van Den Broek | B64D 17/58 244/150 |
| 10,953,975 B1 | * | 3/2021 | Leidich | G05D 1/105 |
| 11,215,708 B2 | | 1/2022 | Endo | |
| 2007/0252042 A1 | | 11/2007 | Smith | |

(Continued)

FOREIGN PATENT DOCUMENTS

| | | |
|---|---|---|
| WO | 2019244591 A1 | 12/2019 |
| WO | WO 2019/244591 | 12/2019 |

OTHER PUBLICATIONS

"International Application Serial No. PCT/US2022/017770, International Search Report dated May 18, 2022", 2 pgs.

(Continued)

*Primary Examiner* — Joshua J Michener
*Assistant Examiner* — Ka Chun Leung
(74) *Attorney, Agent, or Firm* — Kim and Lahey Law Firm, LLC; Douglas W. Kim; Seann P. Lahey

(57) ABSTRACT

The technology relates to payload separation during descent of an aerial vehicle. A flight termination system (FTS) for a lighter than air (LTA) vehicle can include a first, a second, and a third mechanical actuation system. The first mechanical actuation system can be triggered in a first stage, causing an envelope and a payload of the LTA vehicle to separate. The second mechanical actuation system can be triggered in a second stage, causing a parachute to deploy from a component coupled to the payload. The third mechanical actuation system can be triggered in a third stage, causing a parachute to deploy from the envelope. In some cases, one or more of the mechanical actuation systems includes a squib.

17 Claims, 6 Drawing Sheets

(56) References Cited

U.S. PATENT DOCUMENTS

| | | | |
|---|---|---|---|
| 2008/0054125 A1* | 3/2008 | Goorts | B64D 17/56 244/149 |
| 2016/0214716 A1 | 7/2016 | Knoblach | |
| 2016/0280380 A1 | 9/2016 | Fourie | |
| 2018/0294870 A1 | 10/2018 | Van Wynsberghe | |
| 2022/0055732 A1 | 2/2022 | Bergeron | |

OTHER PUBLICATIONS

"International Application Serial No. PCT/US2022/017770, Written Opinion dated May 18, 2022", 13 pgs.

* cited by examiner

PAYLOAD SEPARATION DURING DESCENT OF AERIAL VEHICLE

BACKGROUND OF INVENTION

Fleets of lighter than air (LTA) aerial vehicles are being considered for a variety of purposes, including providing data and network connectivity, data gathering (e.g., image capture, weather and other environmental data, telemetry), and systems testing, among others. LTA vehicles can utilize a balloon envelope, a rigid hull, or a non-rigid hull filled with a gas mixture that is lighter than air to provide lift. In other words, the gas that is lighter than air within the envelope displaces the heavier air, thereby providing buoyancy to the LTA vehicle. Some LTA vehicles are propelled in a direction of flight using propellers driven by engines or motors and utilize fins to stabilize the LTA vehicle in flight.

LTA vehicles can employ flight termination systems that terminate the flight of the vehicle. For example, at the end of a planned flight the LTA vehicle may need to be brought back down to the ground for retrieval, the LTA vehicle may need maintenance, or components of the LTA vehicle may need servicing. In some cases, a flight termination system can be used to bring the LTA vehicle back down to the ground due to an unplanned event, such as if the LTA vehicle has drifted outside of a predetermined geographical area, or if a GPS or a processor onboard the LTA vehicle fails.

BRIEF SUMMARY

The present disclosure provides techniques for payload separation during descent of an aerial vehicle. A flight termination system (FTS) for a lighter than air (LTA) vehicle can include: a first mechanical actuation system configured to be triggered in a first stage, the first mechanical actuation system further configured to cause an envelope and a payload of the LTA vehicle to separate; a second mechanical actuation system configured to be triggered in a second stage, the second mechanical actuation system further configured to cause a parachute to deploy from a component coupled to the payload; and a third mechanical actuation system configured to be triggered in a third stage, the third mechanical actuation system further configured to cause a parachute to deploy from the envelope. In an example, the first mechanical actuation system is configured to be triggered by a signal from a pressure sensor based upon a pressure threshold. In another example, the FTS further comprises two or more absolute pressure sensors, wherein an absolute pressure sensor of the two or more absolute pressure sensors is configured to bigger the first mechanical actuation based on a first absolute pressure threshold, wherein an absolute pressure sensor of the two or more absolute pressure sensors is configured to trigger the second mechanical actuation based on a second absolute pressure threshold, wherein an absolute pressure sensor of the two or more absolute pressure sensors is configured to trigger the third mechanical actuation based on a third absolute pressure threshold, wherein the first absolute pressure threshold is less than the second absolute pressure threshold, and wherein the second absolute pressure threshold is less than the third absolute pressure threshold. In another example, the FTS further comprises two or more pressure altitude sensors, wherein a pressure altitude sensor of the two or more pressure altitude sensors is configured to trigger the first mechanical actuation based on a first pressure altitude threshold, wherein a pressure altitude sensor of the two or more pressure altitude sensors is configured to trigger the second mechanical actuation based on a second pressure altitude threshold, wherein a pressure altitude sensor of the two or more pressure altitude sensors is configured to trigger the third mechanical actuation based on a third pressure altitude threshold, wherein the first pressure altitude threshold is greater than the second pressure altitude threshold, and wherein the second pressure altitude threshold is greater than the third pressure altitude threshold. In another example, the FTS further comprises two or more dynamic pressure sensors, wherein a dynamic pressure sensor of the two or more dynamic pressure sensors is configured to trigger the first mechanical actuation based on a first dynamic pressure threshold, wherein a dynamic pressure sensor of the two or more dynamic pressure sensors is configured to trigger the second mechanical actuation based on a second dynamic pressure threshold, wherein a dynamic pressure sensor of the two or more dynamic pressure sensors is configured to trigger the third mechanical actuation based on a third dynamic pressure threshold, wherein the first dynamic pressure threshold is less than the second dynamic pressure threshold, and wherein the second dynamic pressure threshold is less than the third dynamic pressure threshold. In another example, the FTS further comprises two or more pressure sensors configured to measure pressure rate, wherein a pressure sensor of the two or more pressure sensors is configured to trigger the first mechanical actuation based on a first pressure rate threshold, wherein a pressure sensor of the two or more pressure sensors is configured to trigger the second mechanical actuation based on a second pressure rate threshold, wherein a pressure sensor of the two or more pressure sensors is configured to bigger the third mechanical actuation based on a third pressure rate threshold, wherein the first pressure rate threshold is less than the second pressure rate threshold, and wherein the second pressure rate threshold is less than the third pressure rate threshold. In another example, the first mechanical actuation system is configured to be triggered by an accelerometer based on an acceleration threshold. In another example, the first mechanical actuation system is configured to be triggered by a signal transmitted from an offboard communication system to the LTA vehicle. In another example, the first mechanical actuation system is configured to be triggered by a signal from a sensor or by a signal transmitted from an offboard communication system to the LTA vehicle, and the second and third stages are triggered based on one or two elapsed times from the triggering of the first stage. In another example, the first, the second, and the third mechanical actuation systems each comprise a squib.

A method of terminating the flight of an LTA vehicle, includes: triggering a first mechanical actuation system of a FTS, thereby causing the first mechanical actuation system to fire, in response to which an envelope and a payload of the LTA vehicle is separated; triggering a second mechanical actuation system of the FTS after triggering the first mechanical actuation system, thereby causing the second mechanical actuation system to fire, in response to which a parachute is deployed from the payload; and triggering a third mechanical actuation system of the FTS after triggering the second mechanical actuation system, thereby causing the third mechanical actuation system to fire, in response to which a parachute is deployed from the envelope. In an example, the triggering of the first mechanical actuation system is based a pressure threshold. In another example, the triggering of the first mechanical actuation system is based on a first absolute pressure threshold, wherein the triggering of the second mechanical actuation system is based on a second absolute pressure threshold, wherein the triggering of the third mechanical actuation system is based on a third absolute pressure threshold, wherein the first absolute pressure threshold is less than the second absolute pressure threshold, and wherein the second absolute pressure threshold is less than the third absolute pressure threshold. In another example, the triggering of the first mechanical actuation system is based on a first pressure altitude threshold, wherein the triggering of the second mechanical actuation system is based on a second pressure altitude threshold, wherein the triggering of the third mechanical actuation system is based on a third pressure altitude threshold, wherein the first pressure altitude threshold is greater than the second pressure altitude threshold, and wherein the second pressure altitude threshold is greater than the third pressure altitude threshold. In another example, the triggering of the first mechanical actuation system is based on a first dynamic pressure threshold, wherein the triggering of the second mechanical actuation system is based on a second dynamic pressure threshold, wherein the triggering of the third mechanical actuation system is based on a third dynamic pressure threshold, wherein the first dynamic pressure threshold is less than the second dynamic pressure threshold, and wherein the second dynamic pressure threshold is less than the third dynamic pressure threshold. In another example, the triggering of the first mechanical actuation system is based on a first pressure rate threshold, wherein the triggering of the second mechanical actuation system is based on a second pressure rate threshold, wherein the triggering of the third mechanical actuation system is based on a third pressure rate threshold, wherein the first pressure rate threshold is less than the second pressure rate threshold, and wherein the second pressure rate threshold is less than the third pressure rate threshold. In another example, the triggering of the first mechanical actuation system is based on an acceleration threshold, wherein the acceleration threshold is measured by an accelerometer. In another example, the triggering of the first mechanical actuation system is in response to a signal transmitted from an offboard communication system to the LTA vehicle. In another example, the triggering of the first mechanical actuation system is in response to a signal from a sensor or in response to a signal transmitted from an offboard communication system to the LTA vehicle, and wherein the triggering of the second and the third stages are based on one or two elapsed times from the triggering of the first stage. In another example, the first, the second, and the third mechanical actuations systems each comprise a squib.

Figure 1:
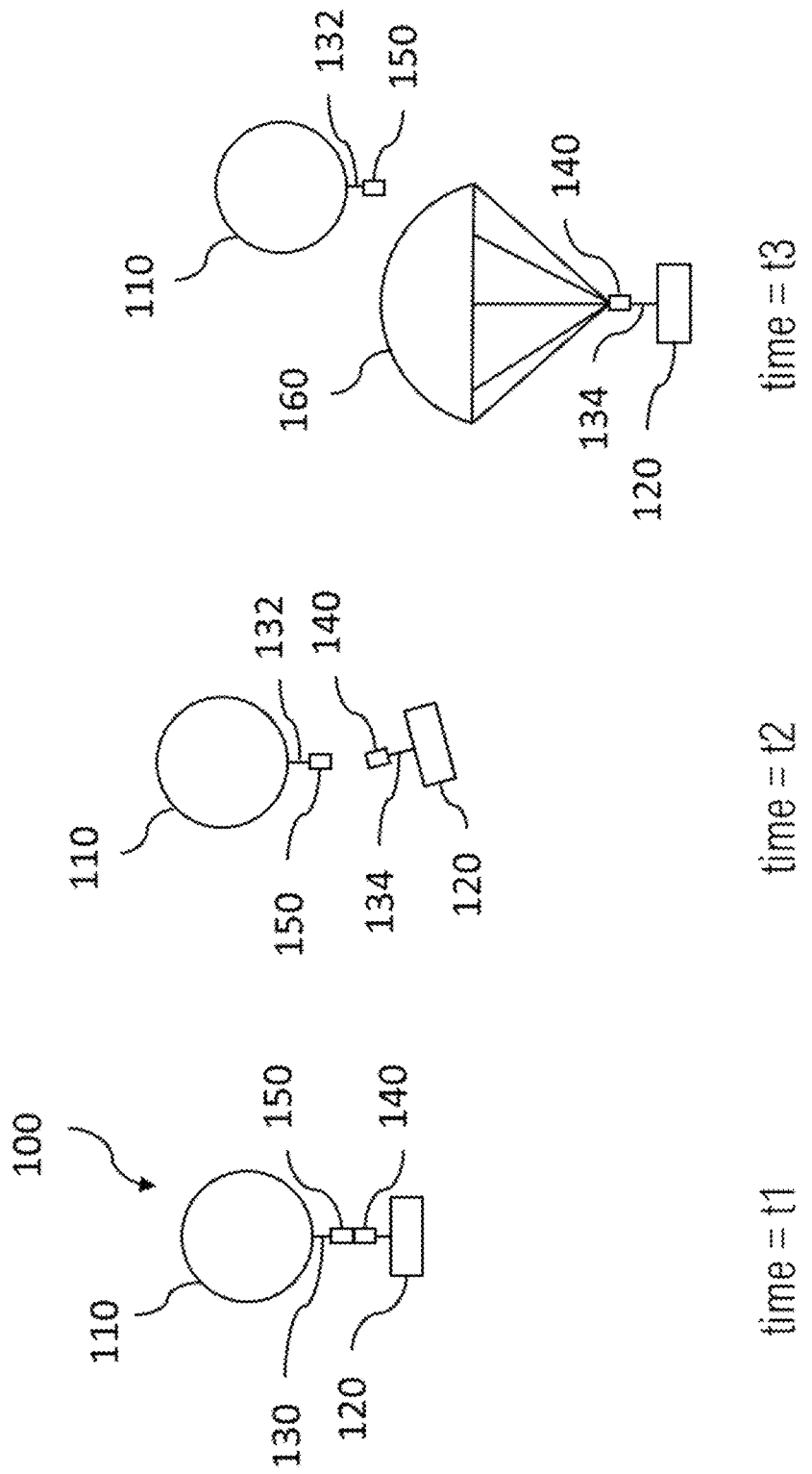
FIG. 1 is a simplified schematic of an example of an LTA vehicle in side view at three different instants in time (t1, t2 and t3), where the LTA vehicle comprises an FTS, in accordance with some embodiments.

The figures depict various example embodiments of the present disclosure for purposes of illustration only. One of ordinary skill in the art will readily recognize from the following discussion that other example embodiments based on alternative structures and methods may be implemented without departing from the principles of this disclosure, and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The invention is directed to payload separation during descent of an aerial vehicle. In some cases, an aerial vehicle has a flight termination system (FTS) configured to protect the vehicle at the end of a flight. The aerial vehicle can be a lighter than air (LTA) vehicle with an envelope that provides lift to the LTA vehicle and a payload that contains systems of the LTA vehicle such as power generation systems, power storage systems, control systems, and/or communication systems. The FTS system for the LTA vehicle can protect the contents of the payload, for example, from being damaged during descent (e.g., by impacting with the envelope, or a component of the envelope such as a cable or tendon), or from being damaged due to impact with the ground.

In some cases, an LTA vehicle may utilize an FTS to trigger one or more stages. For example, a payload may be separated from an envelope in a first stage, and parachutes may be deployed from the payload and the envelope in a second and a third stage. One or more of the FTS stages (e.g., the first stage) may be triggered in response to the LTA vehicle reaching a planned or unplanned end of a flight. The end of a flight of an LTA vehicle can occur when the vehicle has reached the end of its planned flight (e.g., and is still at a float altitude), or has experienced a problem (e.g., the envelope has burst). After the end of a flight, the LTA vehicle will descend to the ground, and the FTS can protect the LTA vehicle and/or reduce the amount of damage caused or sustained upon impact with the ground. For example, separating the payload from the envelope may protect the payload from being damaged by the envelope during this descent. In another example, deploying parachutes from the payload and the envelope may reduce the amount of damage caused or sustained upon impact with the ground.

In some cases, the stages of the FTS are sequenced and/or timed, for example to decrease the amount of damage sustained by the payload and/or the envelope. For example, after the payload and the envelope separate, the FTS can wait to deploy the payload parachute in a second stage until there is a sufficient distance between the payload and the envelope. This may prevent the payload from impacting the envelope after the payload parachute has been deployed. Alternatively, if the FTS caused the payload parachute to deploy immediately after separation, then it will slow the payload right below the envelope resulting in increased collision risk between the envelope and the payload. A collision between the payload and the envelope may cause a parachute deployed from either the payload or the envelope to fail. Thus, delaying parachute deployment from the payload until a sufficient vertical altitude buffer (or vertical gap, or vertical altitude gap) is achieved between the payload and the envelope may be beneficial. In some cases, the FTS has (at least) two distinct triggers, one for separation and one for payload main parachute. In another example illustrating the importance of the sequencing of the stages of the FTS, if the payload parachute is deployed before the separation of the payload and envelope is triggered, then the risk of a collision between the envelope and the payload (e.g., before or after payload-envelope separation), and/or between the parachute of the payload and the envelope, may be increased.

In some cases, an LTA vehicle uses an FTS system to separate a payload and an envelope in a first stage of the FTS, a parachute is deployed from the payload in a second stage of the FTS, and a parachute is deployed from the envelope in a third stage of the FTS. The first stage can occur before the second stage and also before the third stage. The second stage can occur before, after, or at approximately the same time as the second stage. The first, second and third stage of the FTS can be triggered in various ways. Each stage of the FTS can be triggered using onboard sensors, an onboard processor, and/or offboard systems. For example, the first stage of the FTS can be triggered based on a measurement from an onboard sensor (e.g., a pressure altitude sensor indicating that the LTA vehicle has descended below a threshold altitude, or an accelerometer indicating that the envelope has experienced a rapid depressurization), or based on an offboard system indicating that the LTA vehicle has experienced a loss of command and control. The second and third stages can then be triggered, for example, using a timer (e.g., based on an elapsed time from the first stage), or using input from one or more onboard sensors, or using input from an offboard system. For example, the second stage can be triggered at a set time offset (e.g., 30 seconds) after the first stage has been triggered, and the third stage may be triggered simultaneously with the second stage, or may be triggered a second set time offset (e.g., 60 seconds) after the first stage has been triggered. In another example, the second stage can be triggered based on a pressure altitude offset (e.g., 3,000 feet) from the first stage. In another example, the second stage can be triggered based on an altitude measured by an offboard system (e.g., using radar).

In some cases, one or more of the stages of the FTS can be triggered by any measure that steadily increases during descent. For example, the stages of the FTS may be triggered based on signals from one or more pressure sensors. The measurements used to trigger the stages of the FTS can be taken using one or more pressure sensors, such as absolute pressure sensors, pressure altitude sensors, or dynamic pressure sensors.

In some cases, measurements from absolute pressure sensors are used to trigger one or more stages of the FTS based on one or more ambient absolute pressure thresholds. Absolute pressure measurements can be used to ensure that both the sequence of the stages and a sufficient vertical altitude gap (e.g., between the payload and envelope after separation) is achieved. In some cases, a first stage (e.g., a payload-envelope separation stage) can be triggered at a first absolute pressure, a second stage (e.g., a payload parachute deployment stage) can be triggered at a second absolute pressure, and a third stage (e.g., an envelope parachute deployment stage) can be triggered at a third absolute pressure, where the first pressure is lower than the second pressure. In some cases, a fixed absolute pressure offset between the stages is used to ensure that the sequence and the vertical gap are achieved regardless of the altitude at which a stage (e.g., the separation between the payload and the envelope) occurs. In such cases, as the altitude of the vehicle decreases the fixed pressure offset will also cause the vertical gap to reduce, however, maintaining a pressure offset that works at low altitude (e.g., 10,000 feet, or 20,000 feet, or less than 10,000 feet, or less than 20,000 feet) ensures it is sufficient at all altitudes (e.g., up to 60,000 feet, or up to 75,000 feet, or above 60,000 feet, or above 75,000 feet). Using a positive fixed pressure offset ensures that the sequence of the FTS stages triggered by the offset is maintained automatically, for example, with payload-envelope separation occurring at the lower pressure (i.e., higher altitude) and the payload parachute deployment occurring at the higher pressure (i.e., lower altitude). For example, after the payload and the envelope separate in a first stage of the FTS, then the payload parachute can be deployed in a second stage at an absolute pressure that is a fixed offset (e.g., 1,000 Pa, 5,000 Pa, or 10,000 Pa) above the absolute pressure at which the payload and the envelope separated in the first stage.

In some cases, a rate of change of absolute pressure (i.e., a pressure rate) threshold is used to trigger one or more stages of the FTS. A pressure rate can be measured by an absolute pressure sensor coupled to a computer, where the computer has memory to store absolute pressure measurements taken at different times and a processor to calculate a pressure rate based on the stored measurements and the times. As the LTA vehicle or a component thereof (e.g., the payload or the envelope after separation) descends after the end of its flight, the pressure rate steadily increases since the vehicle (or component thereof) gains vertical speed. As the altitude of the vehicle or component decreases and the ambient pressure increases, an increase in vertical speed creates a steadily increasing pressure rate. Pressure rate measurements can be used to ensure that both the sequence of the stages and a sufficient vertical altitude gap (e.g., between the payload and envelope after separation) is achieved. In some cases, a first stage (e.g., a payload-envelope separation stage) can be triggered at a first pressure rate, a second stage (e.g., a payload parachute deployment stage) can be triggered at a second pressure rate, and a third stage (e.g., an envelope parachute deployment stage) can be triggered at a third pressure rate, where the first pressure rate is lower than the second pressure rate. In some cases, a fixed pressure rate offset between the stages is used to ensure that the sequence and the vertical gap are achieved regardless of the altitude at which a stage (e.g., the separation between the payload and the envelope) occurs. For example, after the payload and the envelope separate in a first stage of the FTS, then the payload parachute can be deployed in a second stage at a pressure rate that is a fixed offset (e.g., 10 Pa/s, 100 Pa/s, or from 10 Pa/s to 1000 Pa/s) above the pressure rate at which the payload and the envelope separated in the first stage. In other cases, a stage of the FTS can be triggered based on a pressure rate.

In some cases, measurements from dynamic pressure sensors are used to trigger one or more stages of the FTS based on one or more dynamic pressure thresholds. Dynamic pressure is an aerodynamic pressure proportional to the square of the velocity, described by the equation $(\frac{1}{2})*(\text{air density})*v^2$, where v is velocity and the dynamic pressure is proportional to the square of the velocity. Thus, as either air density increases (as with decreasing altitude) or vertical velocity increases then the dynamic pressure increases. Dynamic pressure measurements can be used to ensure that both the sequence of the stages and a sufficient vertical altitude gap (e.g., between the payload and envelope after separation) is achieved. In some cases, a first stage (e.g., a payload-envelope separation stage) can be triggered at a first dynamic pressure, a second stage (e.g., a payload parachute deployment stage) can be triggered at a second dynamic pressure, and a third stage (e.g., an envelope parachute deployment stage) can be triggered at a third dynamic pressure, where the first dynamic pressure is lower than the second dynamic pressure. In some cases, a fixed dynamic pressure offset between the stages is used to ensure that the sequence and the vertical gap are achieved regardless of the altitude at which a stage (e.g., the separation between the payload and the envelope) occurs. For example, after the payload and the envelope separate in a first stage of the FTS, then the payload parachute can be deployed in a second stage at a dynamic pressure that is a fixed offset (e.g., 10 Pa, 100 Pa, 1,000 Pa, or from 10 Pa to 2,500 Pa) above the dynamic pressure at which the payload and the envelope separated in the first stage.

In some cases, measurements from pressure altitude sensors are used to trigger one or more stages of the FTS based on one or more pressure altitude thresholds. Pressure altitude measurements can be used to ensure that both the sequence of the stages and a sufficient vertical altitude gap (e.g., between the payload and envelope after separation) is achieved. In some cases, a first stage (e.g., a payload-envelope separation stage) can be triggered at a first pressure altitude, a second stage (e.g., a payload parachute deployment stage) can be triggered at a second pressure altitude, and a third stage (e.g., an envelope parachute deployment stage) can be triggered at a third pressure altitude, where the first pressure altitude is higher than the second pressure altitude. In some cases, a fixed altitude offset between the stages is used to ensure that the sequence and the vertical gap are achieved regardless of the altitude at which a stage (e.g., the separation between the payload and the envelope) occurs. For example, after the payload and the envelope separate in a first stage of the FTS, then the payload parachute can be deployed in a second stage at an altitude (measured using a pressure altitude sensor) that is a fixed offset (e.g., 1,000 feet, 3,000 feet, or from 1,000 to 10,000 feet) below the altitude at which the payload and the envelope separated in the first stage.

In some cases, the stages of the FTS are actuated based on the detection of a problem with the LTA vehicle. In some cases, the stages of the FTS are actuated based on one or more signals from one or more sensors that detect a problem with the LTA vehicle. For example, an accelerometer can be coupled to the envelope and configured to detect if the envelope bursts (e.g., if the accelerometer measures an acceleration above a threshold). A measurement from the accelerometer can be used to trigger one or more stages of the FTS.

In another example, a processor can detect a problem with one or more systems of the LTA vehicle, and the FTS can trigger one or more stages based on a signal from the processor. For example, if the LTA vehicle experiences a total or partial loss of command and control, then the processor can detect the loss and send a signal to trigger one or more stages of the FTS. LTA vehicles can be controlled using various types of commands, and a total or partial loss of command and control can describe a state where one or more types of commands cannot be received and/or one or more systems of the LTA vehicle cannot be controlled. For example, an LTA vehicle can receive commands from an offboard system (e.g., a ground station, or another aerial vehicle) and those commands can be used to control various subsystems of the LTA vehicle. An example of a total or partial loss of command and control is the LTA vehicle failing to receive one or more commands from the offboard system and/or the LTA vehicle being unable to control one or more of the various systems (e.g., the LTA vehicle being unable to act on or respond to a received command).

In another example, if an LTA vehicle experiences a problem that causes it to descend below a minimum altitude threshold (or above a maximum absolute pressure threshold), then a pressure sensor (e.g., a pressure altitude sensor or an absolute pressure sensor) can detect that the LTA vehicle has experienced the problem. One or more stages of the FTS can then be triggered, as described herein, in response to the altitude (or pressure) threshold being crossed.

In some cases, the stages of the FTS are actuated based on signals transmitted to the LTA vehicle or a component thereof (e.g., the payload or the envelope after separation) from an offboard communications system. For example, an offboard system (with an offboard communication system) can be used to monitor the LTA vehicle or component thereof, and can send a signal to trigger one or more stages of the FTS based on one or more states or attributes of the LTA vehicle or component thereof. For example, the offboard system can detect a problem with a system (e.g., an altitude control system, or a navigation system) of the LTA vehicle or a component thereof, and in response can send a signal to trigger one or more stages of the FTS to end the flight. In another example, an offboard system can be used to monitor a problematic physical attribute of the LTA vehicle or a component thereof (e.g., the altitude of the LTA vehicle is too low, as determined using an offboard radar system or a sensor onboard the LTA vehicle), and in response can send a signal to end the flight and trigger one or more stages of the FTS.

In some cases, an envelope of an LTA vehicle can be subject to rapid depressurization (e.g., can burst). In such cases, triggering the stages of the FTS quickly (e.g., while conditions are good for payload separation and parachute deployment) can be beneficial. For example, if an envelope experiences rapid depressurization and one or more FTS stages are not triggered in time, then conditions can develop which can increase the risk of damage to the LTA vehicle or a component thereof. For example, in some cases, payload-envelope separation requires that there be sufficient tension between the payload and the envelope. In such cases, if a sufficient tension does not exist, or if a sufficient tension is not continuous (i.e., if a sufficient tension is not present for a sufficient duration of time) then the payload may not be able to separate from the envelope. In such cases, if there is not sufficient tension (for a long enough time period, and/or the tension is discontinuous) then the separation process may not continue to completion. For example, after the LTA vehicle has experienced a problem (e.g., rapid envelope depressurization), if payload-envelope separation is delayed, then conditions can occur where the system can invert (i.e., where the envelope is closer to the ground than the payload). The system can invert, for example, if the decreasing drag of the envelope (e.g., due to consolidation and streamlining) and the resulting velocity of the envelope exceeds that of the payload. Such inversion of the system, caused by delaying payload-envelope separation, can result in entanglement between the envelope and payload and increase the risk that the LTA vehicle or a component thereof is damaged during descent. In some cases, after an LTA vehicle has experienced a rapid depressurization event, then the payload-envelope separation occurs in a short amount of time (e.g., less than 5 minutes, less than 3 minutes, less than 1 minute, less than 30 seconds, less than 10 seconds, less than 5 seconds, or from 10 seconds to 5 minutes) from the rapid depressurization event. In some cases, it may take some period of time which can be shorter (e.g., from 10 seconds to 1 minute) or longer (e.g., from 1 minute to 5 minutes) to sense sufficient pressure rate, pressure altitude rate, or dynamic pressure, which signifies that the LTA vehicle has experienced a real depressurization event and not some other event (e.g., a brief zero pressure event).

In some cases, the LTA vehicle can encounter turbulence (e.g., while at a float altitude), and the turbulence can mimic a start of a descent of the LTA vehicle, and/or can be misinterpreted as a rapid depressurization of the envelope. In cases, where one or more stages of the FTS system are triggered using sensors, then the sensors could misinterpret turbulence as an event where one or more stages of the FTS should be triggered. If the FTS stages are triggered incorrectly, then a flight system of the LTA vehicle may also mistakenly terminate the flight of the LTA vehicle. To avoid triggering the FTS based on misinterpreted measures, the FTS system can be configured to use more robust measurements to trigger the FTS. For example, the FTS can be configured to trigger one or more stages when a rapid depressurization of the envelope is detected using an accelerometer with an acceleration threshold unlikely to be met due to turbulence. In another example, a pressure rate can be used to trigger one or more stages of the FTS. Using a pressure rate measure to trigger a stage of the FTS (e.g., payload-envelope separation) allows the FTS to trigger only when pressure rates indicative of actual rapid depressurization of the envelope are present. Additionally, pressure rate can be a robust measure for LTA vehicles operating at high altitudes (e.g., greater than 30,000 feet, or greater than 50,000 feet) because at high altitudes there is very low ambient pressure and the triggering can be set to modest values of pressure rate and still require a high vertical velocity to achieve those pressure rate values. For example, a highly reliable pressure rate trigger can trigger a stage of an FTS based on a pressure rate threshold that is well above the maximum pressure rate achievable during an extreme turbulence event and below pressure rates at which tension between the payload and envelope will not be sufficient to initiate and continue separation. The values of pressure rates that satisfy the above criteria can vary from vehicle to vehicle depending on attributes such as the operating altitude of the LTA vehicle, and the physical attributes (e.g., the mass, size, shape, or any factor that affects the aerodynamics) of the LTA vehicle (or components thereof).

In some cases, an LTA vehicle may start descending unintentionally. Such unintentional descent can be caused, for example, by temperatures dropping such that buoyancy is lost (e.g., thermal runaway), falsely triggered termination mechanisms, command and control outages, or leaks in the envelope. In such cases, it can be beneficial to delay triggering one or more stages of the FTS until sufficient buoyancy has been lost by the envelope. If the envelope is buoyant, and the envelope and payload separate, then the envelope can start to ascend. Such a situation can be detrimental, for example, because it can increase the risk of damage to the envelope and/or make the envelope more difficult to recover. For example, it can be beneficial to trigger one or more stages of the FTS based on a pressure rate or dynamic pressure that ensures that the LTA vehicle (or a component thereof) is descending quickly (indicating that the envelope has lost sufficient buoyancy). In another example, triggering the FTS based on an ambient pressure that is high enough or an altitude that is low enough (indicating that the balloon has descended to a point which is unachievable in any other condition other than one in which terminating the flight and landing is the best choice) can be beneficial.

In some cases, more than one type of measure can be used to trigger one or more stages of the FTS system. In some cases, different measures are used to trigger different stages of the FTS. For example, a first stage separating the payload and the envelope can be triggered based on an onboard processor (or an offboard system) determining that the LTA vehicle has experienced a problem warranting ending the flight. After triggering the first stage using a processor (or offboard system) then the second and third stages can be triggered based on an elapsed time from the triggering of the first stage, or based on a sensor, as described herein. In some cases, more than one measure is used to trigger a single FTS stage. For example, a stage of the FTS can be triggered based on absolute pressure, pressure rate and/or dynamic pressure thresholds together with a sensor (e.g., an accelerometer) measuring rapid depressurization of the envelope.

In some cases, a stage of an FTS of an LTA vehicle can be triggered based on an absolute pressure, a pressure rate, and/or a sensor configured to detect rapid depressurization. In such a system, if the sensor indicates that the LTA vehicle has experienced a rapid depressurization, then the pressure rate measurements can be used to confirm that a rapid depressurization has occurred before triggering the FTS. In the case that an LTA vehicle does not experience a rapid depressurization event, but does descend to an altitude below a minimum altitude threshold, then an ambient pressure measurement can be used to trigger one or more stages of the FTS prior to a pressure rate threshold being met. In either of the above cases (i.e., rapid depressurization or not), deploying a parachute from the payload (and/or deploying a parachute from the envelope) can be sequenced after payload-envelope separation by setting the trigger thresholds for the parachute deployment stage accordingly. For example, the parachute deployment stage can be triggered at higher absolute pressure, a higher pressure rate, or a lower altitude, than the payload-envelope separation. If the LTA vehicle does not experience a rapid depressurization and the payload-envelope separation is triggered by reaching a minimum altitude threshold, then the separation may occur at a lower altitude than in other cases. However, using an offset (e.g., in absolute pressure, pressure rate, pressure altitude, or dynamic pressure) between the triggers for the separation stage and the parachute deployment stage will ensure that a beneficial sequence of the stages is maintained. Such offsets mean that the parachute deployment stage may occur at different altitudes, depending on how the stages are triggered.

During descent the LTA vehicle and components thereof are subjected to aerodynamic drag forces. The LTA vehicle and components thereof may be designed to withstand structural loads from the drag forces expected during descent. In some cases, the drag forces are related to the terminal velocity of the LTA vehicle or components thereof (e.g., the payload and envelope after separation) which are a function of the air density, vertical velocity, the area and the mass of the vehicle or component, and any buoyancy due to residual lift gas. The aerodynamic drag forces can evolve predictably during descent resulting in consistent structural loading across different descents. However, should the area of the LTA vehicle or a component thereof decrease unexpectedly, for example by a solar panel becoming partially or completely detached, the LTA vehicle or component thereof will increase in speed resulting in higher than expected drag forces. In such cases, an overspeed trigger based on a dynamic pressure threshold can be used to trigger one or more stages of the FTS, and thereby take into account the physical phenomenon of aerodynamic drag loading. The dynamic pressure threshold at which the FTS stage is triggered can be set higher than dynamic pressures expected during a flight, and therefore would cause the FTS to trigger if something unforeseen happened to speed up the descent of the LTA vehicle or component thereof, which could increase the risk of damage to the LTA vehicle or component thereof.

In some cases, after the payload and the envelope separate, a first sensor coupled to the payload and a second sensor coupled to the envelope are used to trigger parachute deployment from the payload (in a second stage) and deployment of a parachute from the envelope (in a third stage), respectively. The first and second sensors can be absolute pressure sensors, pressure altitude sensors, or dynamic pressure sensors. The first and second sensors can be the same type or different types of sensors, in different cases. For example, a parachute can be deployed from the payload based on a measurement from the first sensor coupled to the payload in a stage of the FTS, and a parachute can be deployed from the envelope based on a measurement from the second sensor coupled to the envelope in another stage of the FTS. In some cases, the first and the second sensors are in communication with each other (e.g., by direct communication, or by both sensors being in communication with a common system, for example a common system offboard the LTA vehicle). In such cases, one or more stages of the FTS can be triggered using an absolute pressure difference, a pressure altitude difference, a dynamic pressure difference, and/or a pressure rate difference between the payload and the envelope based on compared measurements between the first and the second sensors.

In some cases, one or more stages of the FTS are triggered by one or more thresholds, for example, absolute pressure thresholds, pressure altitude thresholds, dynamic pressure thresholds, pressure rate thresholds, acceleration thresholds and/or timing thresholds (i.e., when a stage is triggered after an elapsed time). The thresholds used to trigger stages of the FTS can be predetermined before a flight of the LTA vehicle, or can be determined in situ during a flight of the LTA vehicle.

In the case that the thresholds are predetermined, the thresholds can be determined based on previously collected data (e.g., position vs. time data from the descent of an LTA vehicle and/or components thereof), and/or calculations that rely on one or more attributes of the LTA vehicle or a component thereof (e.g., mass, size, shape and/or susceptibility to damage).

In the case that the thresholds are determined in situ during a flight of the LTA vehicle, the thresholds can be determined using a function, a lookup table, and/or other relationship. In some cases, thresholds that are determined in situ can be determined based on predetermined information (i.e., determined before the flight of the LTA vehicle) and information obtained during a flight of the LTA vehicle. For example, a constant offset in absolute pressure between triggering the first and second stages of an FTS can be predetermined before the flight, and an absolute pressure threshold for the second stage can be set in situ during the flight by obtaining the absolute pressure at which the first stage was triggered and then adding the predetermined constant offset in absolute pressure to that obtained value. In another example, a lookup table (or a function) of absolute pressure offsets between a first and a second stage of an FTS can be predetermined, where the lookup table (or function) describes different absolute pressure offsets to be applied depending on the pressure at which the first stage is triggered. In this example, an absolute pressure threshold for the second stage can be set in situ during the flight by obtaining the absolute pressure at which the first stage was triggered, determining the absolute pressure offset associated with that obtained absolute pressure by referring to the lookup table (or function), and then adding the appropriate absolute pressure offset from the lookup table (or function) to the obtained absolute pressure value.

In some cases, an LTA vehicle contains an FTS with two or more stages for payload-envelope separation and parachute deployment, as described herein, and further contains additional stages. For example, an FTS can include a stage wherein the envelope of the LTA is depressurized, for example, by cutting into the envelope (e.g., using a squib actuated system with a blade), or by actuating a valve (e.g., a dedicated valve or one that is part of an altitude control system). Such envelope depressurization can occur before or after any of the FTS stages described herein. For example, an FTS can depressurize the envelope before the envelope and the payload separate to prevent the envelope from ascending after payload-envelope separation.

Example Systems

FIG. 1 is a simplified schematic of an example of an LTA vehicle 100 in side view at three different instants in time (t1, t2 and t3), where the LTA vehicle comprises an FTS. The LTA vehicle 100 in FIG. 1 contains an envelope 110, a payload 120, and a down-connect 130 coupling the envelope 110 to the payload 120. The LTA vehicle 100 in this example has a down-connect 130 with a first module 140 and a second module 150 both coupled to the down-connect 130. The modules 140 and/or 150 can contain mechanical actuation systems used by the FTS, for example, to separate the envelope 110 from the payload 120, and/or deploy parachutes from the payload 120 and/or the envelope 110 (e.g., after separation). The mechanical actuation systems of modules 140 and/or 150 can, in some examples, contain squibs. For example, modules 140 and/or 150 can contain mechanical actuation systems that use squibs to separate the envelope 110 and the payload 120. In some examples, modules 140 and/or 150 can be actuation modules that also provide a means to actively turn payload 120. In some examples, modules 140 and/or 150 can contain electronics assemblies with wiring that electrically couples electronics components coupled to the envelope 110 with electronics components coupled to the down-connect 130 and/or the payload 120. The modules 140 and 150 are shown coupled to the down-connect 130 at two locations in this example. However, in other examples, modules 140 and/or 150 can be coupled to the down-connect 130 at different locations than those shown in FIG. 1, such as a location adjacent to (or closer to) the envelope 110, or a location adjacent to (or closer to) the payload 120. In some cases, module 150 can be coupled directly to the envelope 110 and/or module 140 can be coupled directly to the payload 120, and module 140 and/or 150 can be a component of the FTS system containing squib actuated systems for separating the envelope 110 from the payload 120.

In some cases, a computer (described further below) is coupled to and controls different components of the FTS, such as modules 140 and/or 150. For example, a computer can be used to receive measurements of absolute pressure, pressure altitude, pressure rate, dynamic pressure and/or acceleration (e.g., by interfacing with sensors), set thresholds (e.g., by performing calculations, for example, using sensor measurements and offsets, lookup tables, and/or other functions), and trigger components of the FTS (e.g., mechanical actuation systems).

At time t1 in FIG. 1, the LTA vehicle 100 has reached the end of its flight. The envelope 110 in this example may be pressurized at time t1 or may have experienced a rapid depressurization event (not shown). The end of the flight at time t1 can be determined using an onboard sensor, an onboard processor, and/or offboard systems, as described herein. For example, the LTA vehicle 100 may have reached its end of flight due to the vehicle descending below an altitude threshold as detected by an onboard absolute pressure sensor or a pressure altitude sensor, or due to a loss of command and control as detected by an onboard processor or an offboard system.

At time t2 in FIG. 1, the FTS has triggered a first stage, wherein the envelope 110 has separated from the payload 120. The envelope 110 in this example may be pressurized at time t2, or may have experienced a rapid depressurization event (not shown), or may have lost some (or all) buoyancy. In the first stage, a mechanical actuation system (e.g., using squibs and contained in module 140 and/or 150) is triggered to separate the envelope 110 from the payload 120. The first stage of the FTS can be triggered (i.e., after time t1 and before time t2) using an onboard sensor, an onboard processor, and/or offboard systems, as described herein. For example, the first stage of the FTS can be triggered by the LTA vehicle 100 descending below an altitude threshold as detected by an onboard absolute pressure sensor or a pressure altitude sensor, or by the LTA vehicle 100 experiencing a dynamic pressure greater than a threshold as measured by an onboard dynamic pressure sensor. In the example shown in FIG. 1, after the first FTS stage triggered, the down-connect 130 has separated into two pieces 132 and 134, coupled to the envelope 110 and the payload 120, respectively. Module 140 is coupled to the down-connect 134 that is coupled to the payload 120, and module 150 is coupled to the down-connect 132 that is coupled to the envelope 110. In other examples, the down-connect 130 can separate at a different location, or not separate at all and remain coupled to either the envelope 110 or the payload 120 after the envelope 110 and the payload 120 separate in a stage of the FTS. In the example shown in FIG. 1, the modules 140 and 150 are components of the FTS system (e.g., containing squib actuated mechanical systems) for separating the envelope 110 from the payload 120 before time t2.

Between times t2 and t3 in FIG. 1, the payload 120 is not connected to the envelope 110 and the payload 120 begins to descend. In some cases, the payload 120 descends at a faster rate than the envelope 110 during this time interval. The FTS then triggers a second stage, where a parachute 160 is deployed from module 140 coupled to the payload 120 (through the down-connect 134). As described herein, there may be a delay between payload 120 and envelope 110 separation in the first stage and parachute 160 deployment in the second stage, for example, to reduce the risk of the payload 120 colliding with the envelope 110 after the parachute 160 is deployed. In the second stage, a mechanical actuation system (e.g., using squibs and contained in module 140) is triggered to deploy parachute 160 from module 140 coupled to the payload 120. The second stage of the FTS can be triggered (before time t2) using an onboard sensor, an onboard processor, and/or offboard systems, as described herein. For example, the second stage of the FTS can be triggered by the payload 120 descending below an altitude threshold as detected by an absolute pressure sensor or a pressure altitude sensor coupled to the payload 120 (e.g., contained in module 140), or by the payload 120 experiencing a dynamic pressure greater than a threshold as measured by a dynamic pressure sensor coupled to the payload 120 (e.g., contained in module 140). Time t3 shows the parachute 160 after it has been deployed. The parachute 160 slows the rate of descent of the payload 120, thereby reducing the chance of damage upon reaching the ground.

Figure 2:
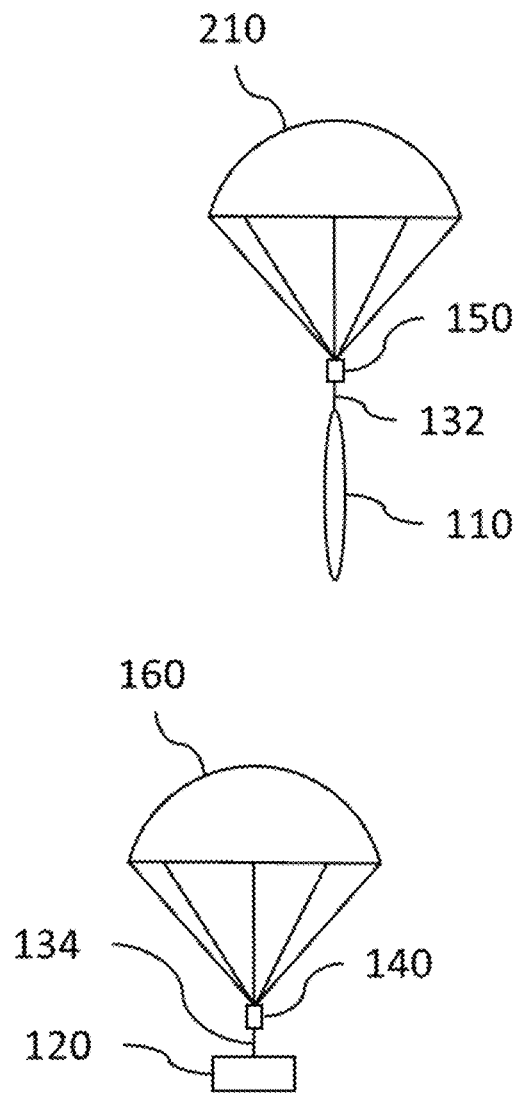
FIG. 2 is a simplified schematic of an example of separated components of an LTA vehicle in side view at an instant in time t4, in accordance with some embodiments.

FIG. 2 is a simplified schematic of an example of separated components (i.e., payload 120 and envelope 110) of an LTA vehicle in side view at an instant in time t4. The LTA vehicle and the components thereof shown in FIG. 2 are the same as or similar to the LTA vehicle and components thereof shown in FIG. 1, and like numbered elements are the same between FIGS. 1 and 2. Time t4 occurs after time t2 in FIG. 1, and may occur at approximately the same time as time t3 in FIG. 1, or may occur after time t3 in FIG. 1. After time t2, the FTS triggers a third stage in which a parachute 210 is deployed from module 150 coupled to the envelope 110 (through the down-connect 132). In the third stage, a mechanical actuation system (e.g., using squibs and contained in module 150) is triggered to deploy parachute 210 from the envelope 110. In some cases, the FTS can deploy a parachute from a component (not shown) coupled to the portion of the down-connect 132 coupled to the envelope 110. In some cases, a dynamic pressure can cause the parachute to deploy from envelope 110 after time t2. The envelope 110 is shown as at least somewhat deflated (i.e., at least somewhat depressurized) compared to the pressurized envelope 110 in FIG. 1. At time t4, the envelope 110 can be pressurized, be depressurized (e.g., due to a rapid depressurization event), or be somewhat pressurized, in different cases. The third stage of the FTS can be triggered (after time t2) using an onboard sensor, an onboard processor, and/or offboard systems, as described herein. For example, the third stage of the FTS can be triggered by the envelope 110 descending below an altitude threshold as detected by an absolute pressure sensor or a pressure altitude sensor coupled to the envelope 110 (e.g., contained in module 150), or by the envelope 110 experiencing a dynamic pressure greater than a threshold as measured by a dynamic pressure sensor coupled to the envelope 110 (e.g., contained in module 150).

In some cases (e.g., in the case of a communication failure between different systems within the LTA vehicle and/or between the LTA vehicle and a ground station), a robust way of detecting a separation of the payload 120 from the envelope 110 after the first stage of the FTS is detecting that the envelope 110 of the LTA vehicle has exceeded a typical (or predetermined) float altitude (e.g., due to the buoyancy of the envelope 110). Such a separation detection method can be faster than waiting for batteries of an FTS to run out, and can also be more available than relying on SATCOM communication to the FTS on the envelope.

In some cases, before or after times t1, t2, t3, and/or t4, the FTS in the examples shown in FIGS. 1 and 2 can trigger additional stages. For example, before time t2, the FTS can depressurize the envelope (e.g., using a squib actuated mechanical actuation system with a blade, or using a valve) to prevent the envelope from ascending after payload-envelope separation.

Figure 3A:
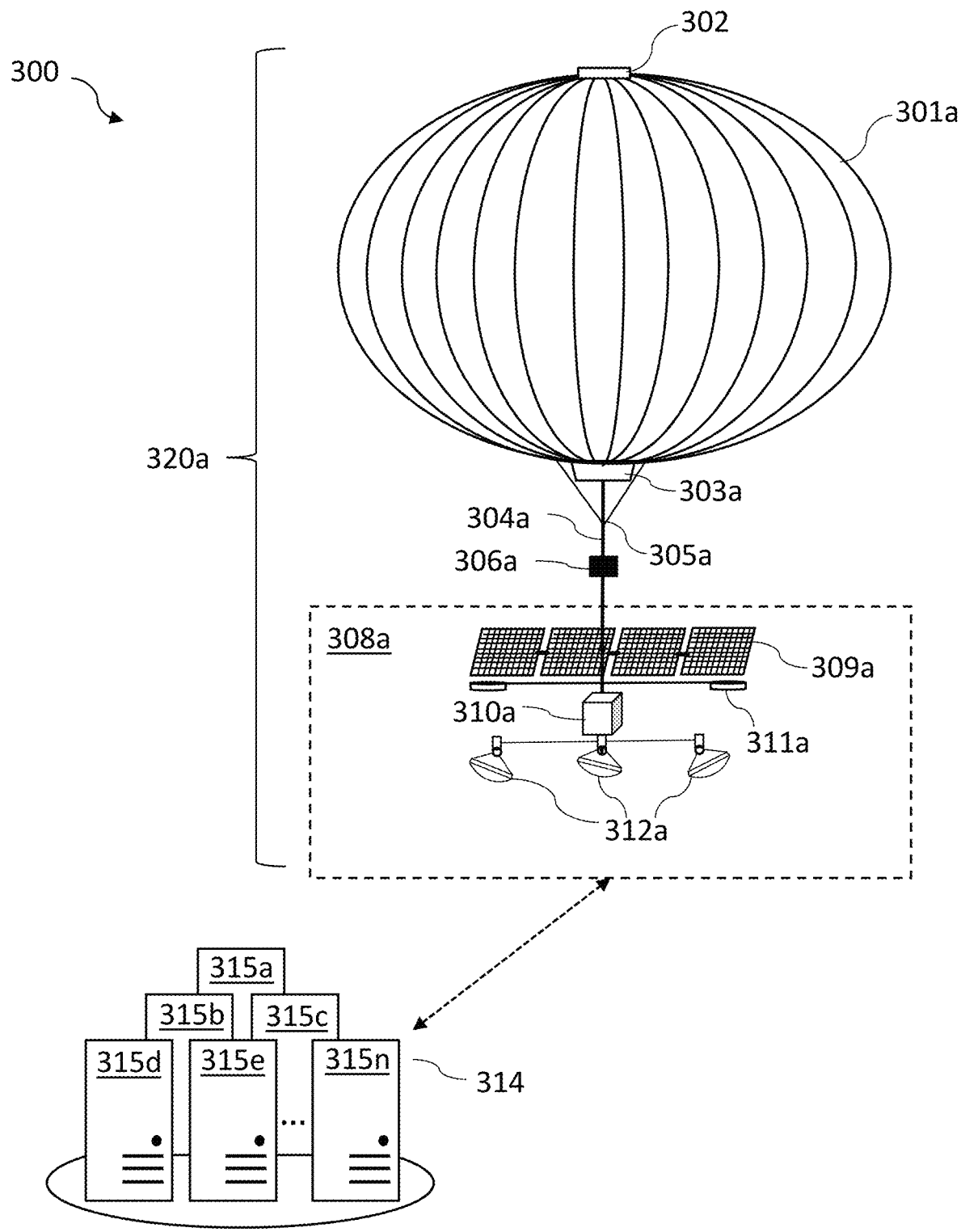
FIGS. 3A-3B are diagrams of example LTA vehicle systems incorporating FTSs, in accordance with some embodiments.
Figure 3B:
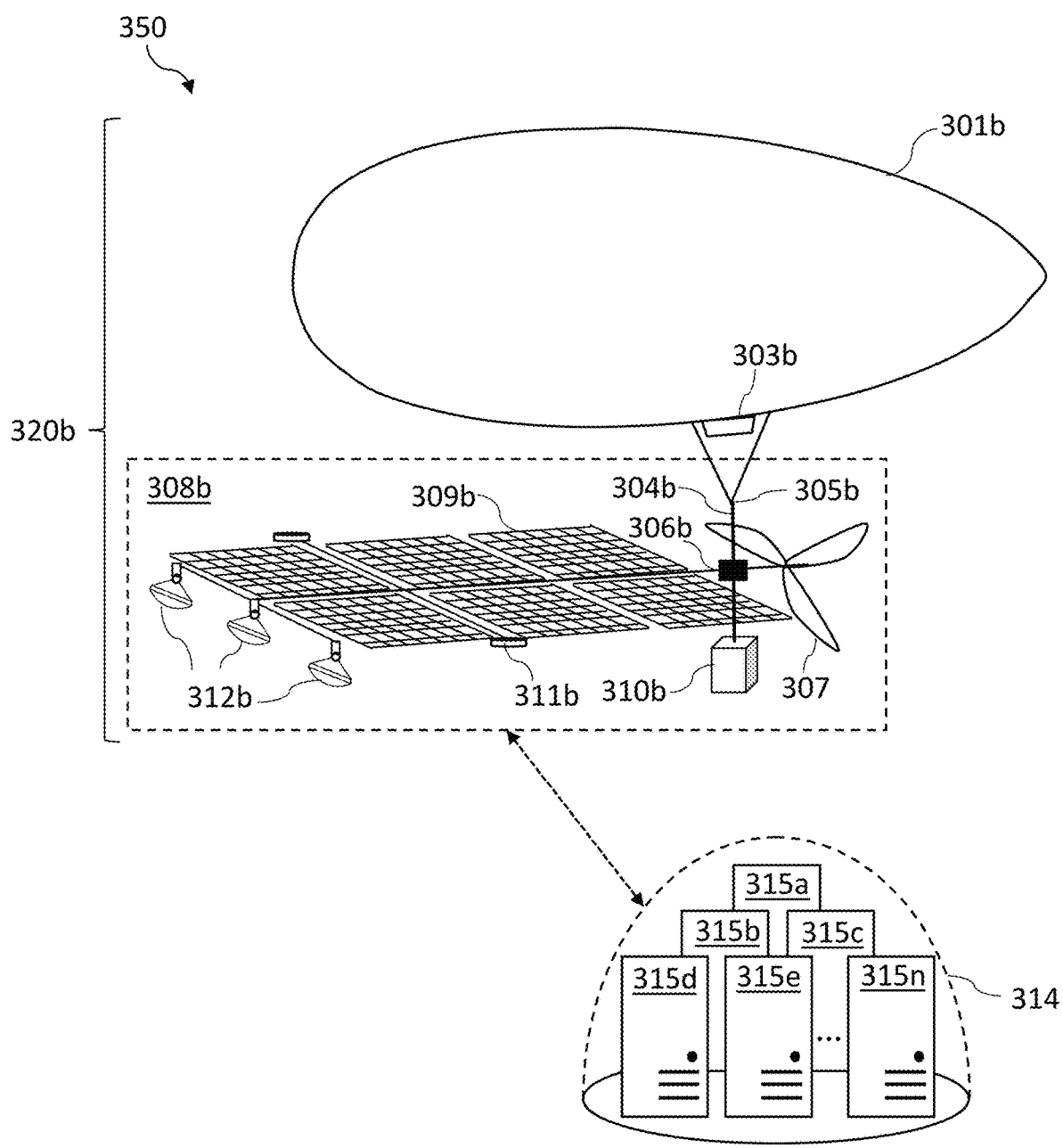

FIGS. 3A-3B are diagrams of example LTA vehicle systems incorporating FTSs, in accordance with some embodiments. The LTA vehicles 320a-b shown in FIGS. 3A-3B, and described further below, contain FTSs with stages triggered by onboard sensors, onboard processors, and/or offboard systems, as described herein.

In FIG. 3A, there is shown a diagram of system 300 for navigation of LTA vehicle 320a. In some examples, LTA vehicle 320a may be a passive vehicle, such as a balloon or satellite, wherein most of its directional movement is a result of environmental forces, such as wind and gravity. In other examples, LTA vehicle 320a may be actively propelled. In an embodiment, system 300 may include LTA vehicle 320a and ground station 314. In this embodiment, LTA vehicle 320a may include balloon 301a, plate 302, altitude control system (ACS) 303a, connection 304a, joint 305a, actuation module 306a, and payload 308a. Actuation module 306a (or 306b in FIG. 3B) can be module 140 and/or module 150 in FIGS. 1 and 2, in some cases. In some examples, plate 302 may provide structural and electrical connections and infrastructure. Plate 302 may be positioned at the apex of balloon 301a and may serve to couple together various parts of balloon 301a. In other examples, plate 302 also may include a flight termination unit (e.g., that is a part of the FTS system), such as one or more blades and an actuator to selectively cut a portion and/or a layer of balloon 301a. ACS 303a may include structural and electrical connections and infrastructure, including components (e.g., fans, valves, actuators, etc.) used to, for example, add and remove air from balloon 301a (i.e., in some examples, balloon 301a may include an interior ballonet within its outer, more rigid shell that is inflated and deflated), causing balloon 301a to ascend or descend, for example, to catch stratospheric winds to move in a desired direction. Balloon 301a may comprise a balloon envelope comprised of lightweight and/or flexible latex or rubber materials (e.g., polyethylene, polyethylene terephthalate, chloroprene), tendons (e.g., attached at one end to plate 302 and at another end to ACS 303a) to provide strength to the balloon structure, a ballonet, along with other structural components. In various embodiments, balloon 301a may be non-rigid, semi-rigid, or rigid.

Connection (i.e., down-connect) 304a may structurally, electrically, and communicatively, connect balloon 301a and/or ACS 303a to various components comprising payload 308a. In some examples, connection 304a may provide two-way communication and electrical connections, and even two-way power connections. Connection 304a may include a joint 305a, configured to allow the portion above joint 305a to pivot about one or more axes (e.g., allowing either balloon 301a or payload 308a to tilt and turn). Actuation module 306a may provide a means to actively turn payload 308a for various purposes, such as improved aerodynamics, facing or tilting solar panel(s) 309a advantageously, directing payload 308a and propulsion units (e.g., propellers 307 in FIG. 3B) for propelled flight, or directing components of payload 308a advantageously. In some cases, the down-connect 304a is configured to separate at a separation point causing the payload 308a and the balloon 301a to separate from one another (e.g., due to triggering by an FTS). In such cases, the down-connect can also include a parachute (not shown) (e.g., similar to parachute 160 in FIG. 1 and/or parachute 210 in FIG. 2) that can be deployed to slow the descent of the payload 308a and/or the balloon 301a after separation. The separation point can be located anywhere on the down-connect 304a. For example, the separation point can be located at a point closer to the balloon 301a than a module containing a parachute coupled to the down-connect 304a, such that after separation the parachute remains coupled to the payload 308a. In some cases, a module containing a parachute is coupled to the down-connect 304a at a location close to the payload 308a, the separation point is close to the module at a location between the module and the balloon 301a, and other components (e.g., an actuation component, a propulsion component, and/or a flexible knuckle) are coupled to the down-connect 304a between the separation point and the balloon 301a.

Payload 308a may include solar panel(s) 309a, avionics chassis 310a, broadband communications unit(s) 311a, and terminal(s) 312a. Solar panel(s) 309a may be configured to capture solar energy to be provided to a battery or other energy storage unit, for example, housed within avionics chassis 310a. Avionics chassis 310a also may house a flight computer (e.g., to electronically control various systems within the LTA vehicle 320a, such as computing device 401 in FIG. 4), a transponder, along with other control and communications infrastructure (e.g., a computing device and/or logic circuit configured to control LTA vehicle 320a). In some cases, the flight computer controls the FTS, for example, by sending signals to components of the FTS to trigger different FTS stages. For example, the flight computer can send a signal to a mechanical actuation system containing a squib that is configured to separate the payload 308a from the balloon 301a, or to deploy a parachute. Communications unit(s) 311a may include hardware to provide wireless network access (e.g., LTE, fixed wireless broadband via 5G, Internet of Things (IoT) network, free space optical network or other broadband networks). Terminal(s) 312a may comprise one or more parabolic reflectors (e.g., dishes) coupled to an antenna and a gimbal or pivot mechanism (e.g., including an actuator comprising a motor). Terminal(s) 312(a) may be configured to receive or transmit radio waves to beam data long distances (e.g., using the millimeter wave spectrum or higher frequency radio signals). In some examples, terminal(s) 312a may have very high bandwidth capabilities. Terminal(s) 312a also may be configured to have a large range of pivot motion for precise pointing performance. Terminal(s) 312a also may be made of lightweight materials.

In other examples, payload 308a may include fewer or more components, including propellers 307 as shown in FIG. 3B, which may be configured to propel LTA vehicles 320a-b in a given direction. In still other examples, payload 308a may include still other components well known in the art to be beneficial to flight capabilities of an LTA vehicle. For example, payload 308a also may include energy capturing units apart from solar panel(s) 309a (e.g., rotors or other blades (not shown) configured to be spun by wind to generate energy). In another example, payload 308a may further include or be coupled to an imaging device (e.g., a star tracker, IR, video, Lidar, and other imaging devices, for example, to provide image-related state data of a balloon envelope, airship hull, and other parts of an LTA vehicle). In another example, payload 308a also may include various sensors (not shown), for example, housed within avionics chassis 310a or otherwise coupled to connection 304a or balloon 301a. Such sensors may include Global Positioning System (GPS) sensors, wind speed and direction sensors such as wind vanes and anemometers, temperature sensors such as thermometers and resistance temperature detectors, speed of sound sensors, acoustic sensors, pressure sensors such as barometers and differential pressure sensors, accelerometers, gyroscopes, combination sensor devices such as inertial measurement units (IMUs), light detectors, light detection and ranging (LIDAR) units, radar units, cameras, other image sensors, and more. These examples of sensors are not intended to be limiting, and those skilled in the art will appreciate that other sensors or combinations of sensors in addition to these described may be included without departing from the scope of the present disclosure.

Ground station 314 may include one or more server computing devices 315*a-n*, which in turn may comprise one or more computing devices (e.g., a computing device and/or logic circuit configured to control LTA vehicle 320*a*). In some examples, ground station 314 also may include one or more storage systems, either housed within server computing devices 315*a-n*, or separately. Ground station 314 may be a datacenter servicing various nodes of one or more networks. In some cases, ground station 314 can communicate with LTA vehicle 320*a* and one or more stages of the FTS of LTA vehicle 320*a* can be triggered based on signals sent from the ground station 314 to the LTA vehicle 320*a*.

FIG. 3B shows a diagram of system 350 for navigation of LTA vehicle 320*b*. All like-numbered elements in FIG. 3B are the same or similar to their corresponding elements in FIG. 3A, as described above (e.g., balloon 301*a* and balloon 301*b* may serve the same function, and may operate the same as, or similar to, each other). In some examples, balloon 301*b* may comprise an airship hull or dirigible balloon. In this embodiment, LTA vehicle 320*b* further includes, as part of payload 308*b*, propellers 307, which may be configured to actively propel LTA vehicle 320*b* in a desired direction, either with or against a wind force to speed up, slow down, or re-direct, LTA vehicle 320*b*. In this embodiment, balloon 301*b* also may be shaped differently from balloon 301*a*, to provide different aerodynamic properties.

As shown in FIGS. 3A-3B, LTA vehicles 320*a-b* may be largely wind-influenced LTA vehicle, for example, balloons carrying a payload (with or without propulsion capabilities) as shown, or fixed wing high altitude drones (not shown) with gliding and/or full propulsion capabilities. However, those skilled in the art will recognize that the systems disclosed herein may similarly apply and be usable by various other types of LTA vehicles.

Figure 4:
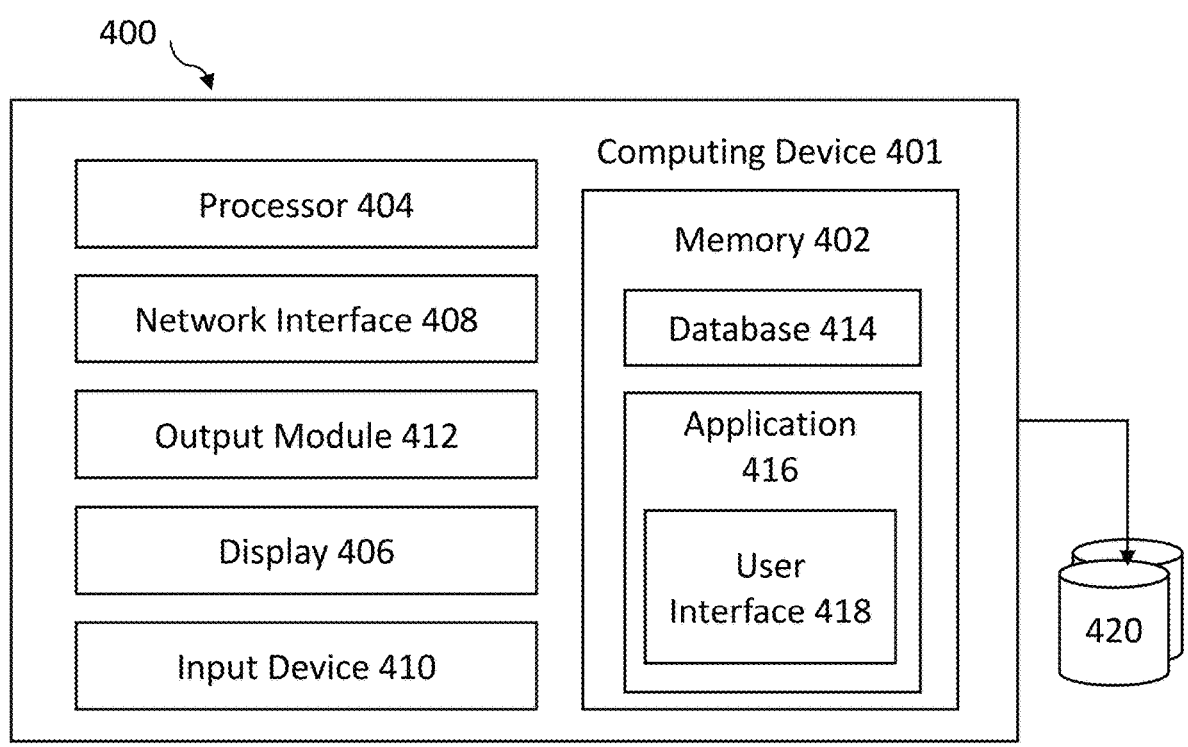
FIG. 4 is a simplified block diagram of an example of a computing system forming part of the systems of FIGS. 3A-3B, in accordance with some embodiments.

FIG. 4 is a simplified block diagram of an example of a computing system forming part of the systems of FIGS. 3A-3B, in accordance with one or more embodiments. Any reference to a computer (e.g., flight computer, server, processor, etc.) herein may be implemented using the computing system 400 in FIG. 4. In some cases, the computing system 400 is coupled to different components of the FTS (e.g., sensors and mechanical actuation systems), controls the FTS (e.g., by sending signals to mechanical actuation systems of the FTS, and/or using information received from sensors), and/or calculates thresholds for different triggers for the stages of the FTS, as described herein. In one embodiment, computing system 400 may include computing device 401 and storage system 420. Storage system 420 may comprise a plurality of repositories and/or other forms of data storage, and it also may be in communication with computing device 401. In another embodiment, storage system 420, which may comprise a plurality of repositories, may be housed in one or more of computing device 401 (not shown). In some examples, storage system 420 may store state data, commands, flight policies, and other various types of information (e.g., pressure measurements, thresholds, and offsets) as described herein. This information may be retrieved or otherwise accessed by one or more computing devices, such as computing device 401 or server computing devices 410 in FIG. 4, in order to perform some or all of the features described herein. Storage system 420 may comprise any type of computer storage, such as a hard-drive, memory card, ROM, RAM, DVD, CD-ROM, write-capable, and read-only memories. In addition, storage system 420 may include a distributed storage system where data is stored on a plurality of different storage devices, which may be physically located at the same or different geographic locations (e.g., in a ground station (e.g., 314 in FIGS. 3A-3B), or in a distributed computing system (not shown)). Storage system 420 may be networked to computing device 401 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 401 also may include a memory 402. Memory 402 may comprise a storage system configured to store a database 414 and an application 416. Application 416 may include instructions which, when executed by a processor 404, cause computing device 401 to perform various steps and/or functions, as described herein. Application 416 further includes instructions for generating a user interface 418 (e.g., graphical user interface (GUI)). Database 414 may store various algorithms and/or data, including neural networks (e.g., encoding flight policies, as described herein) and data regarding wind patterns, weather forecasts, past and present locations of aerial vehicles (e.g., aerial vehicles 320*a-b*), sensor data, map information, air traffic information, among other types of data. For example, database 414 may store sensor measurements, thresholds, offsets, predetermined information about the LTA vehicle 320*a-b* and/or the FTS, and/or information obtained in situ during a flight of the FTS, as described herein. Memory 402 may include any non-transitory computer-readable storage medium for storing data and/or software that is executable by processor 404, and/or any other medium which may be used to store information that may be accessed by processor 404 to control the operation of computing device 401.

Computing device 401 may further include a display 406, a network interface 408, an input device 410, and/or an output module 412. Display 406 may be any display device by means of which computing device 401 may output and/or display data. Network interface 408 may be configured to connect to a network using any of the wired and wireless short range communication protocols described herein, as well as a cellular data network, a satellite network, free space optical network and/or the Internet. Input device 410 may be a mouse, keyboard, touch screen, voice interface, and/or any or other hand-held controller or device or interface by means of which a user may interact with computing device 401. Output module 412 may be a bus, port, and/or other interface by means of which computing device 401 may connect to and/or output data to other devices and/or peripherals.

In some examples, computing device 401 may be located remote from an aerial vehicle (e.g., remote from aerial vehicles 320*a-b*, such as in ground station 314, in FIGS. 3A-3B) and may communicate with and/or control the operations of an aerial vehicle, or its control infrastructure as may be housed in avionics chassis 310*a-b*, via a network. In one embodiment, computing device 401 is a data center or other control facility (e.g., configured to run a distributed computing system as described herein), and may communicate with a controller and/or flight computer housed in avionics chassis 310*a-b* via a network. As described herein, system 400, and particularly computing device 401, may be used for planning a flight path or course for an aerial vehicle based on wind and weather forecasts to move said aerial vehicle along a desired heading or within a desired radius of a target location. Various configurations of system 400 are envisioned, and various steps and/or functions of the processes described below may be shared among the various devices of system 400, or may be assigned to specific devices.

Example Methods

Figure 5:
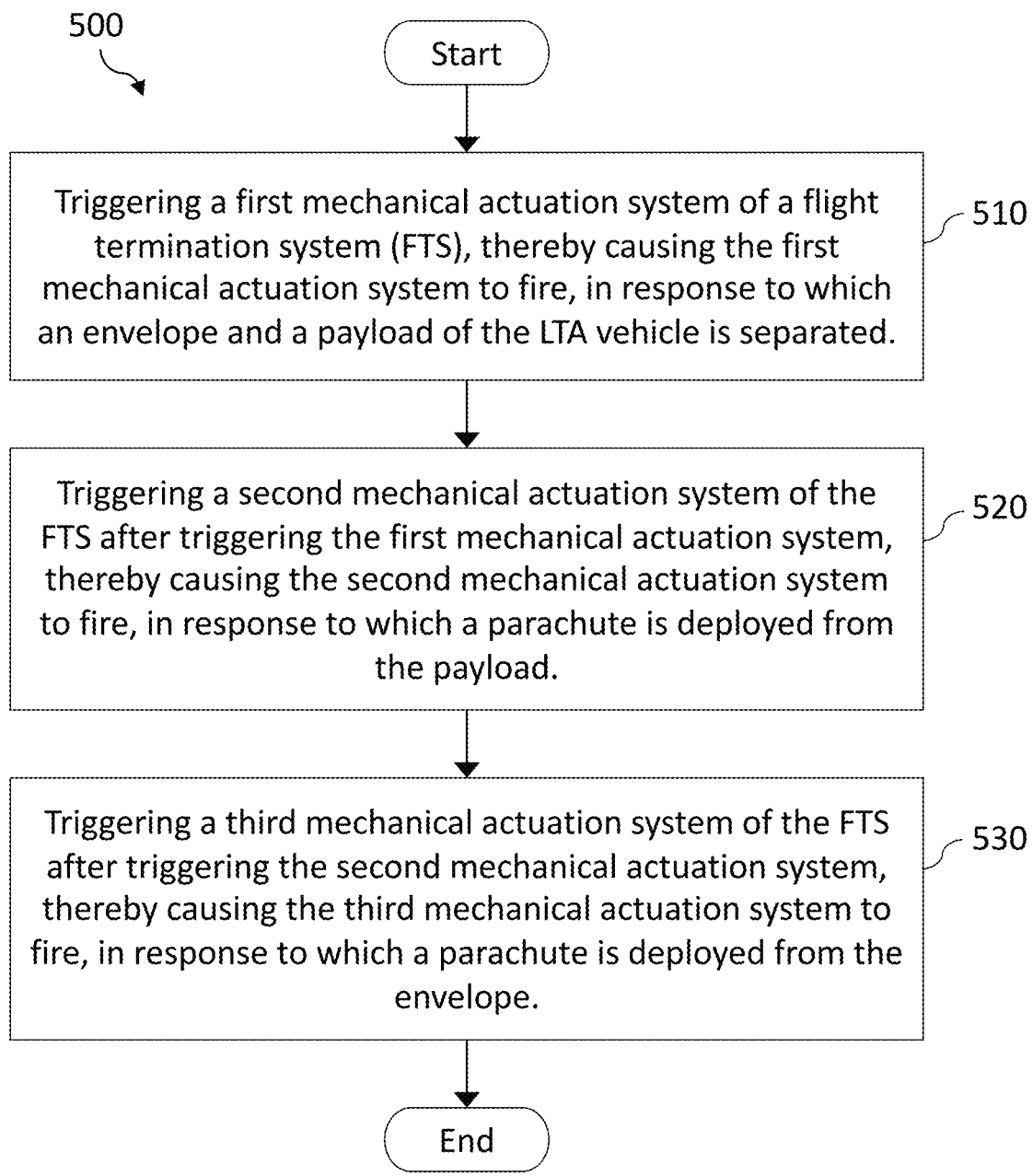
FIG. 5 is a flow diagram illustrating a method 500 for terminating a flight of an LTA vehicle, in accordance with some embodiments.

FIG. 5 is a flow diagram illustrating a method 500 for terminating a flight of an LTA vehicle. A first stage of the FTS, where a payload and an envelope of the LTA vehicle are separated, is described in step 510. In the first stage, a first mechanical actuation system of an FTS is triggered, thereby causing the first mechanical actuation system to fire, in response to which the envelope and the payload of the LTA vehicle is separated. A second stage of the FTS, where a parachute is deployed from the payload, is described in step 520. In the second stage, a second mechanical actuation system of the FTS is triggered after triggering the first mechanical actuation system, thereby causing the second triggered mechanical actuation system to fire, in response to which a parachute is deployed from the payload. A third stage of the FTS, where a parachute is deployed from the envelope, is described in step 530. In the third stage, a third mechanical actuation system of the FTS is triggered after triggering the second mechanical actuation system, thereby causing the third mechanical actuation system to fire, in response to which a parachute is deployed from the envelope.

In some cases, the first, second and third stages of the FTS described in method 500 can be triggered based on one or more pressure thresholds, as described herein. The pressure thresholds can be absolute pressure thresholds, pressure altitude thresholds, dynamic pressure thresholds and/or pressure rate thresholds, as described herein. In some cases, the first, second and third stages of the FTS described in method 500 can be triggered based on one or more signals transmitted from an offboard communication system to the LTA vehicle. In some cases, the first, second and third mechanical actuation systems described in method 500 each comprise a squib.

In some cases, one or more stages of the FTS in method 500 are triggered by one or more thresholds, for example, absolute pressure thresholds, pressure altitude thresholds, dynamic pressure thresholds, pressure rate thresholds, acceleration thresholds and/or timing thresholds (i.e., when a stage is triggered after an elapsed time). The thresholds used to trigger stages of the FTS can be predetermined before a flight of the LTA vehicle, or can be determined in situ during a flight of the LTA vehicle, as described herein.

In some cases, method 500 further contains additional stages. For example, method 500 can include an additional step describing a stage wherein the envelope of the LTA is depressurized, as described herein. Such envelope depressurization can occur before or after any of the steps 510, 520 and 530 of method 500. For example, before step 510 in method 500, a step can be added that includes depressurizing the envelope to prevent the envelope from ascending after payload-envelope separation in step 510.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements.

What is claimed is:

1. A flight termination system (FTS) for a lighter than air (LTA) vehicle, comprising:
    a first mechanical actuation system configured to be triggered in a first stage, the first mechanical actuation system further configured to cause an envelope and a payload of the LTA vehicle to be separated and detached from each other;
    a second mechanical actuation system configured to be triggered in a second stage and triggered subsequent to the first stage, the second mechanical actuation system further configured to cause a parachute to deploy from a component coupled to the payload; and
    a third mechanical actuation system configured to be triggered in a third stage associated with termination of flight of the LTA vehicle and triggered subsequent to the first stage, the third mechanical actuation system further configured to cause a parachute to deploy from a component coupled to the envelope,
    further comprising two or more pressure sensors, wherein a common pressure sensor or a first pressure sensor of the two or more pressure sensors is configured to trigger the first mechanical actuation based on a first pressure threshold associated with the LTA vehicle,
    wherein the common pressure sensor or the first pressure sensor or a second pressure sensor of the two or more pressure sensors is configured to trigger the second mechanical actuation based on a second pressure threshold associated with the payload,
    wherein the common pressure sensor or the second pressure sensor or a third pressure sensor of the two or more pressure sensors is configured to trigger the third mechanical actuation based on a third pressure threshold associated with the envelope,
    wherein the first pressure threshold is less than the second pressure threshold, and
    wherein the second pressure threshold is less than the third pressure threshold.

2. The flight termination system for a lighter than air vehicle of claim 1, wherein the two or more pressure sensors comprise two or more absolute pressure sensors,
    wherein a common absolute pressure sensor or a first absolute pressure sensor of the two or more absolute pressure sensors is configured to trigger the first mechanical actuation based on a first absolute pressure threshold associated with the LTA vehicle,
    wherein the common absolute pressure sensor or the first absolute pressure sensor or a second absolute pressure sensor of the two or more absolute pressure sensors is configured to trigger the second mechanical actuation based on a second absolute pressure threshold associated with the payload,
    wherein the common absolute pressure sensor or the second absolute pressure sensor or a third absolute pressure sensor of the two or more absolute pressure sensors is configured to trigger the third mechanical actuation based on a third absolute pressure threshold associated with the envelope, wherein the first absolute pressure threshold is less than the second absolute pressure threshold, and wherein the second absolute pressure threshold is less than the third absolute pressure threshold.

3. The flight termination system for a lighter than air vehicle of claim 1, wherein the two or more pressure sensors comprise two or more pressure altitude sensors, wherein a common pressure altitude sensor or a first pressure altitude sensor of the two or more pressure altitude sensors is configured to trigger the first mechanical actuation based on a first pressure altitude threshold associated with an altitude of the LTA vehicle, wherein the common pressure altitude sensor or the first pressure altitude sensor or a second pressure altitude sensor of the two or more pressure altitude sensors is configured to trigger the second mechanical actuation based on a second pressure altitude threshold associated with an altitude of the payload, wherein the common pressure altitude sensor or the second pressure altitude sensor or a third pressure altitude sensor of the two or more pressure altitude sensors is configured to trigger the third mechanical actuation based on a third pressure altitude threshold associated with an altitude of the envelope, wherein the first pressure altitude threshold is greater than the second pressure altitude threshold, and wherein the second pressure altitude threshold is greater than the third pressure altitude threshold.

4. The flight termination system for a lighter than air vehicle of claim 1, wherein the two or more pressure sensors comprise two or more dynamic pressure sensors, wherein a common dynamic pressure sensor or a first dynamic pressure sensor of the two or more dynamic pressure sensors is configured to trigger the first mechanical actuation based on a first dynamic pressure threshold associated with dynamic pressure at the LTA vehicle, wherein the common dynamic pressure sensor or the first dynamic pressure sensor or a second dynamic pressure sensor of the two or more dynamic pressure sensors is configured to trigger the second mechanical actuation based on a second dynamic pressure threshold associated with dynamic pressure at the payload, wherein the common dynamic pressure sensor or the second dynamic pressure sensor or a third dynamic pressure sensor of the two or more dynamic pressure sensors is configured to trigger the third mechanical actuation based on a third dynamic pressure threshold associated with dynamic pressure at the envelope, wherein the first dynamic pressure threshold is less than the second dynamic pressure threshold, and wherein the second dynamic pressure threshold is less than the third dynamic pressure threshold.

5. The flight termination system for a lighter than air vehicle of claim 1, wherein the two or more pressure sensors are configured to measure pressure rate, wherein a common pressure sensor or a first pressure sensor of the two or more pressure sensors is configured to trigger the first mechanical actuation based on a first pressure rate threshold associated with a pressure rate at the LTA vehicle, wherein the common pressure sensor or the first pressure sensor or a second pressure sensor of the two or more pressure sensors is configured to trigger the second mechanical actuation based on a second pressure rate threshold associated with a pressure rate at the payload, wherein the common pressure sensor or the second pressure sensor or a third pressure sensor of the two or more pressure sensors is configured to trigger the third mechanical actuation based on a third pressure rate threshold associated with a pressure rate at the envelope, wherein the first pressure rate threshold is less than the second pressure rate threshold, and wherein the second pressure rate threshold is less than the third pressure rate threshold.

6. The flight termination system for a lighter than air (LTA) vehicle of claim 1, wherein the second mechanical actuation system is configured to be triggered to cause a parachute to deploy from a component coupled to the payload upon the payload reaching an acceleration rate threshold measured by an accelerometer.

7. The flight termination system for a lighter than air (LTA) vehicle of claim 1, wherein the first mechanical actuation system is configured to be triggered by a signal transmitted from an offboard communication system to the LTA vehicle.

8. The flight termination system for a lighter than air (LTA) vehicle of claim 1, wherein the first mechanical actuation system is configured to be triggered by a signal from a sensor or by a signal transmitted from an offboard communication system to the LTA vehicle, and wherein the second and third stages are triggered based on one or two elapsed times from the triggering of the first stage.

9. A method of terminating the flight of a lighter than air (LTA) vehicle, comprising:

triggering a first mechanical actuation system of a flight termination system (FTS), thereby causing the first mechanical actuation system to actuate, and in response to actuation of the first mechanical actuation system an envelope and a payload of the LTA vehicle are separated and detached from each other;

triggering a second mechanical actuation system of the FTS after triggering the first mechanical actuation system and after the envelope and the payload of the LTA vehicle are separated and detached from each other, thereby causing the second mechanical actuation system to actuate, and in response to actuation of the second mechanical actuation system a parachute is deployed from a component coupled to the payload; and triggering a third mechanical actuation system of the FTS to terminate flight of the LTA vehicle after triggering the second mechanical actuation system and after the envelope and the payload of the LTA vehicle are separated and detached from each other, by causing the third mechanical actuation system to actuate, and in response to actuation of the third mechanical actuation system a parachute is deployed from a component coupled to the envelope, wherein the triggering of the first mechanical actuation system is based upon a pressure threshold signaled to the mechanical actuation system by a pressure sensor associated with the LTA vehicle, and wherein the triggering of the second mechanical actuation system is based upon a pressure threshold signaled to the second mechanical actuation system by a pressure sensor associated with the payload, and wherein the triggering of the third mechanical actuation system is based upon a pressure threshold signaled to the third mechanical actuation system by a pressure sensor associated with the envelope.

10. The method of claim 9, wherein the triggering of the first mechanical actuation system is based upon an air pressure threshold signaled to the mechanical actuation system by an air pressure sensor associated with the LTA vehicle, and wherein the triggering of the second mechanical actuation system is based upon an air pressure threshold signaled to the second mechanical actuation system by an air pressure sensor associated with the payload, and wherein the triggering of the third mechanical actuation system is based upon an air pressure threshold signaled to the third mechanical actuation system by an air pressure sensor associated with the envelope.

11. The method of claim 9, wherein the triggering of the first mechanical actuation system is based on a first absolute pressure threshold associated with absolute pressure at the LTA vehicle, wherein the triggering of the second mechanical actuation system is based on a second absolute pressure threshold associated with absolute pressure at the payload, wherein the triggering of the third mechanical actuation system is based on a third absolute pressure threshold associated with absolute pressure at the envelope, wherein the first absolute pressure threshold is less than the second absolute pressure threshold, and wherein the second absolute pressure threshold is less than the third absolute pressure threshold.

12. The method of claim 9, wherein the triggering of the first mechanical actuation system is based on a first pressure altitude threshold associated with an altitude of the LTA vehicle, wherein the triggering of the second mechanical actuation system is based on a second pressure altitude threshold associated with an altitude of the payload, wherein the triggering of the third mechanical actuation system is based on a third pressure altitude threshold associated with an altitude of the envelope, wherein the first pressure altitude threshold is greater than the second pressure altitude threshold, and wherein the second pressure altitude threshold is greater than the third pressure altitude threshold.

13. The method of claim 9, wherein the triggering of the first mechanical actuation system is based on a first dynamic pressure threshold associated with a dynamic pressure at the LTA vehicle, wherein the triggering of the second mechanical actuation system is based on a second dynamic pressure threshold associated with a dynamic pressure at the payload, wherein the triggering of the third mechanical actuation system is based on a third dynamic pressure threshold associated with a dynamic pressure at the envelope, wherein the first dynamic pressure threshold is less than the second dynamic pressure threshold, and wherein the second dynamic pressure threshold is less than the third dynamic pressure threshold.

14. The method of claim 9, wherein the triggering of the first mechanical actuation system is based on a first pressure rate threshold associated with a pressure rate at the LTA vehicle, wherein the triggering of the second mechanical actuation system is based on a second pressure rate threshold associated with a pressure rate at the payload, wherein the triggering of the third mechanical actuation system is based on a third pressure rate threshold associated with a pressure rate at the envelope, wherein the first pressure rate threshold is less than the second pressure rate threshold, and wherein the second pressure rate threshold is less than the third pressure rate threshold.

15. The method of claim 9, wherein the triggering of the second mechanical actuation system causes the parachute to deploy from the component coupled to the payload and triggering of the second mechanical actuation system is based upon the payload reaching an acceleration rate threshold, wherein the acceleration rate threshold is measured by an accelerometer.

16. The method of claim 9, wherein the triggering of the first mechanical actuation system is in response to a signal transmitted from an offboard communication system to the LTA vehicle.

17. The method of claim 9, wherein the triggering of the first mechanical actuation system is in response to a signal from a sensor or in response to a signal transmitted from an offboard communication system to the LTA vehicle, and wherein the triggering of the second and the third stages are based on one or two elapsed times from the triggering of the first stage.

* * * * *